CARD ARRESTING DEVICE FOR USE IN TIME RECORDING APPARATUS

Filed April 30, 1953 3 Sheets-Sheet 1

INVENTORS
LARS FOLKE BERTIL AHLBERG
SVEN INGVAR LUNDGREN
BY [signature]
ATTORNEY

CARD ARRESTING DEVICE FOR USE IN TIME RECORDING APPARATUS

Filed April 30, 1953 3 Sheets-Sheet 2

INVENTORS
LARS FOLKE BERTIL AHLBERG
SVEN INGVAR LUNDGREN
BY Frederick L. Haas
ATTORNEY Feb. 19, 1957 L. F. B. AHLBERG ET AL 2,781,845

CARD ARRESTING DEVICE FOR USE IN TIME RECORDING APPARATUS

Filed April 30, 1953 3 Sheets-Sheet 3

INVENTORS
LARS FOLKE BERTIL AHLBERG
SVEN INGVAR LUNDGREN
BY [signature]
ATTORNEY United States Patent Office 2,781,845

Patented Feb. 19, 1957

2,781,845

CARD ARRESTING DEVICE FOR USE IN TIME RECORDING APPARATUS

Lars Folke Bertil Ahlberg, Storangen, and Sven Ingvar Lundgren, Johanneshov, Sweden, assignors to Telefonaktiebolaget L M Ericsson, Stockholm, Sweden, a corporation of Sweden Application April 30, 1953, Serial No. 352,222

Claims priority, application Sweden May 12, 1952

4 Claims. (Cl. 164—59)

In certain time-recording apparatus, a hole is punched in the time recording card at each punching operation. This hole serves to determine the position of the card at the next punching, a testing pin penetrating into the hole and stopping the card one line higher than at the previous punching. With such apparatus the two guiding edges of the card and the card control device must fit rather exactly, since otherwise the hole may pass beside the test pin. Further, the card may be pushed into the card-control-device with such a speed, that due to its inertia the test pin has no time to penetrate into the hole. Finally, the cards are sometimes pushed into the apparatus with such great force, that the test pin considerably deforms the hole.

According to our invention the card is allowed to have a considerably greater play within the card control device, due to two test pins having been provided side by side, which pins may operate alternatively. By using such a construction, it is possible to make the test pin and the releasing devices function with an extremely small amount of inertia, and therefore to penetrate quicker into a passing by hole. A short lever is provided close to said hole-finding pins, which presses the card against a fixed abutment parallel to said card when a test pin penetrates into a hole. The test pin will therefore not touch the edge of the hole, or touch it only slightly, and thus the edge will not be deformed, however hard the card is pushed into the apparatus.

The invention will now be described more in detail with reference to the accompanying drawings.

In the description, such known means in the apparatus, as for example the punching mechanism and the punching hammer for time-recording, which are not necessary for the disclosure of the invention, have not been shown.

Figures 1, 2:
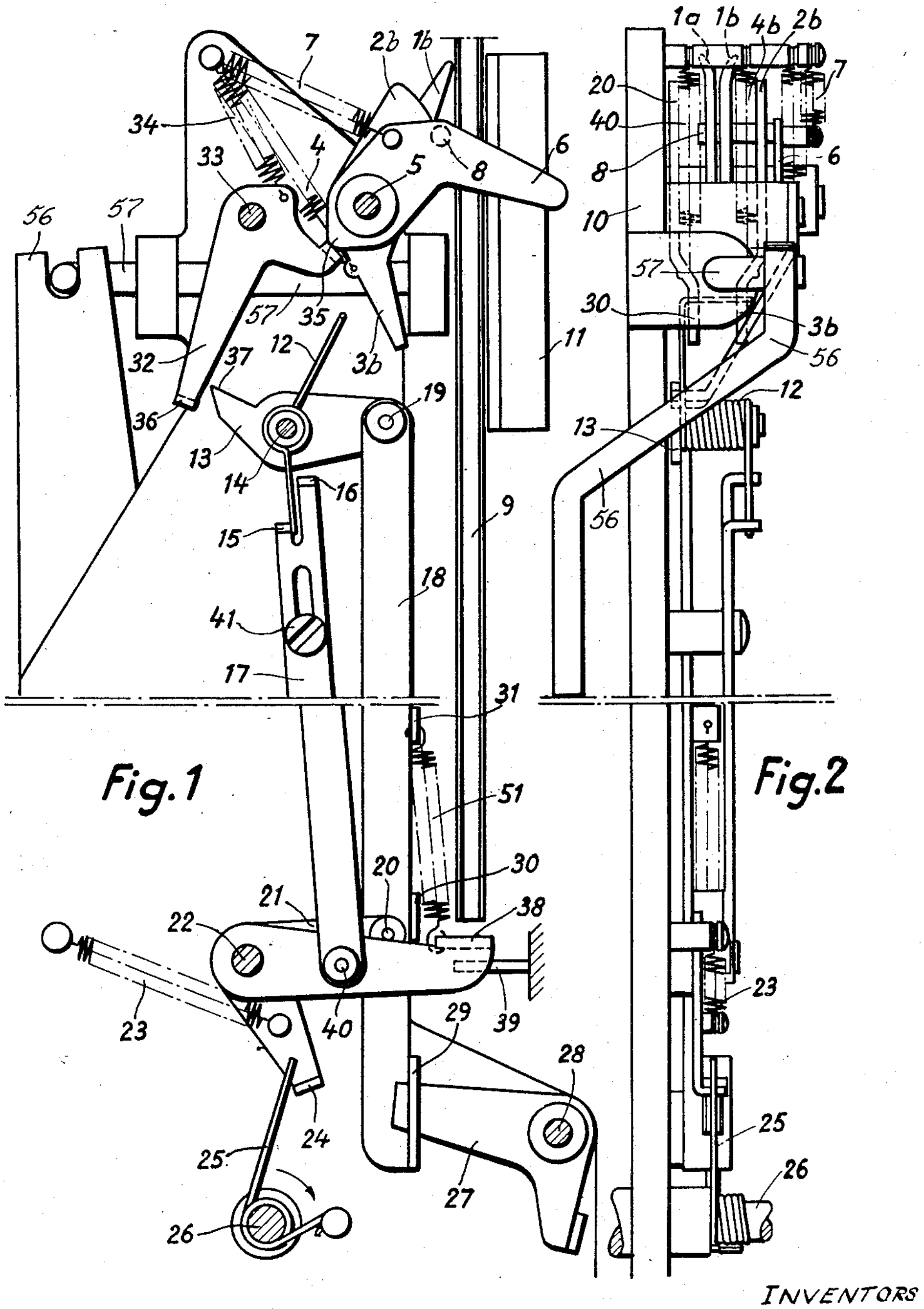
Fig. 1 is a side-projection of the card-stopping mechanism with the releasing devices.
Fig. 2 shows the same mechanism seen from the back.

Each of the hole-finder tips 1*a* and 1*b*, Figs. 2 and 1, is rigidly fixed to the corresponding locking levers 2*a*, 2*b*. The details 1*a*, 2*a*, and 1*b*, 2*b* are mounted side by side on a shaft 5 fixed in a frame 10. The springs 4*a* and 4*b* are anchored in the locking levers 2. Said springs turn the levers clockwise. Besides the hole-finder locking details a releasing lever 6 is mounted on the same shaft 5. Said releasing lever 6 is turned counter-clockwise by the spring 7 and is provided with a stud 8 resting on the two-hole-finder tips 1*a* and 1*b*. The torque of the releasing lever 6 is greater than the total torque of the hole-finder tips, and therefore these are turned counter-clockwise to a position, of equilibrium shown in Fig. 1.

Figure 12:
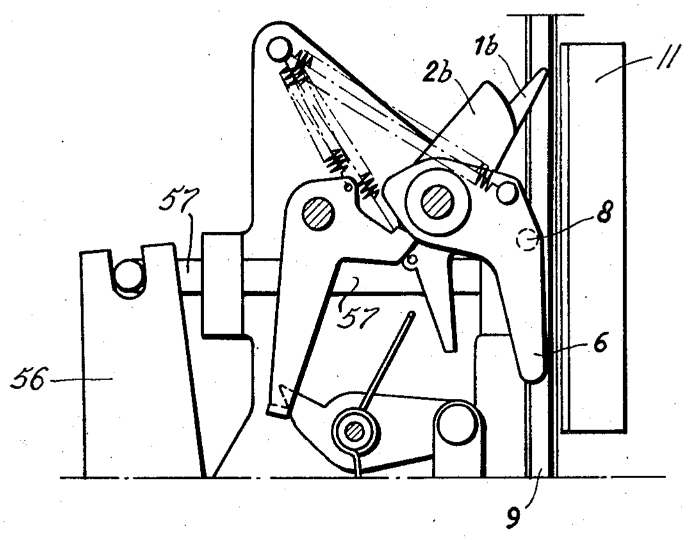
Fig. 12 is a detail of Fig. 1.

In front of the hole-finder tips there is a card path 9. When in the rest position, the hole-finder tips lie outside said path, whereas the releasing lever 6 lies right across the path. When a card is introduced into the mechanism from above, it meets the releasing lever 6 and pushes it downwardly, whereby a clockwise rotary motion is obtained. The stud 8 thereby releases the hole-finder tips, which are brought to rest against the card, as shown in Fig. 12. When a hole in the card passes by a hole-finder tip, the tip penetrates into the hole, causing the levers 1 and 2 to rotate forwards, until the further edge of the locking lever 2 rests on the card. The angle between a line from said point of contact to the centre of the shaft 5 and a line perpendicular to the card leading to the same centre is dimensioned in relation to the friction coefficient between the card and the locking lever 2 in such a manner that the card is squeezed between the locking lever 2 and a stationary stop plate or member 11, which latter is rigidly connected with the shaft 5.

Figure 3:
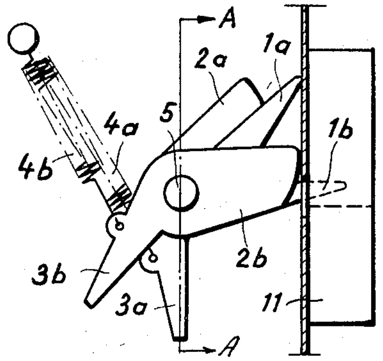
Figs. 3–5 show different positions of a hole-finder seen from the side.
Figure 6:
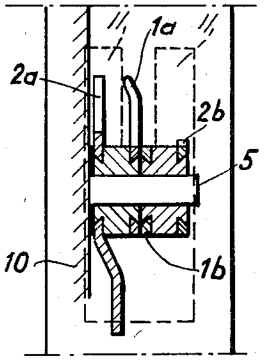
Figs. 6–8 show a section through the cut A—A in Figs. 3–5.
Figure 9:
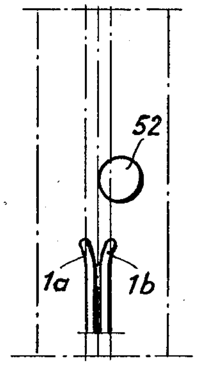
Figs. 9–11 show the positions of a hole in a card in relation to the tips of the hole-finders, said positions corresponding to those shown in Figs. 3–5.
Figure 4:
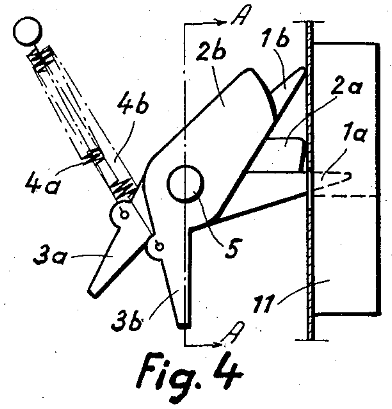
Figure 7:
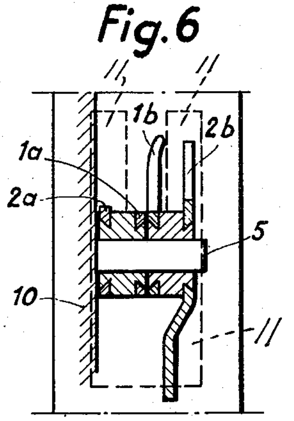
Figure 10:
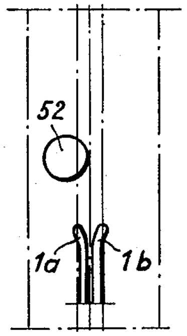
Figure 5:
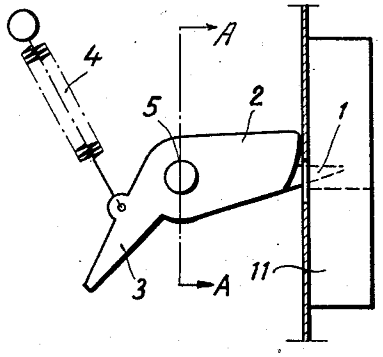
Figure 8:
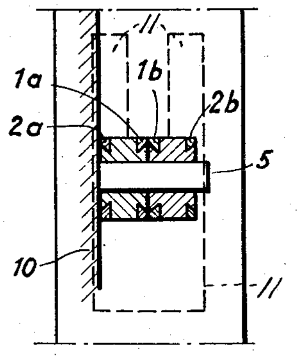
Figure 11:
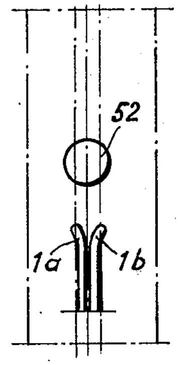

Depending on the position of the hole in the card one or the other or both hole-finder tips will penetrate into the hole, which is illustrated in the Figures 3–11. If, in relation to the hole-finder tips 1*a*, 1*b*, a hole 52 in a card is set in the position shown in Fig. 9, the tip 1*b* will penetrate into the hole. The different parts of the hole-finder device will thereby be set as shown in Figs. 3 and 6. If the tip 1*a* penetrates into a hole, as is indicated in Fig. 10, the different parts will take the positions shown in Figs. 4 and 7. The tips 1*a* and 1*b* are placed so in relation to a hole, that it is possible for both tips to penetrate simultaneously into the hole. Figs. 5, 8 and 11 illustrate this case.

One of the ends of the locking levers 2*a* and 2*b* is prolonged into a lever 3*a*, and 3*b*, respectively. Either one or both arms actuate one of the shanks of a coiled locking spring 12. The coil of the spring is tightly wound upon a hub on the releasing lever 13, which is mounted on a shaftpin 14 fixed in the frame. The opposite shank of the spring rests against an ear 15 on the lever 17, a clockwise rotation of the releasing lever thereby being prevented. When the locking spring 12 is actuated by one of the prolongations 3 of the locking levers its upper shank is made to rotate counter-clockwise, whereby the diameter of the spring coil is increased and the releasing lever 13 released.

At one end of the releasing lever 13 there is a releasing bar 18, which at one of its ends is mounted on a pin 19. The releasing bar 18 is at its other end mounted on the shaftpin 20 of the lever 21, which in turn is mounted on the shaft 22 fixed in the frame. The lever 21 is made to rotate clockwise by the spring 23, and therefore the releasing bar 18 is moved downwardly when the releasing lever 13 is released by the spring 12.

The lever 21 is on one of its sides provided with an unfolded ear which, upon rotation of the lever, loosens the coil of a locking spring 25 or some other locking means on the shaft 26. While the spring 25 remains unoperated any clockwise rotation of the shaft 26 is prevented. When the lever 21 rotates, the upper shank of the spring 25 is driven counter-clockwise, the diameter of the coil spring thereby being increased and the shaft 26 released.

The shaft 26 is subjected to a torque by means of a spring device, which is loaded again after each stamping operation. When the locking spring 25 releases the shaft 26, said shaft momentarily rotates one turn thereby effecting the necessary stamping- and hole-punching operations over a lever system. This lever system generally designated by 56 operates a punch 57 (see Figs. 1 and 12) which as a result punches a hole into the card slightly below the next preceding hole. As a result, a detecting finger or pin entering a punched hole can stop the card one line higher than the line at which it was arrested during the last preceding punching operation.

The releasing shaft 18 has three unfolded ears 29, 30, 31. The lowest of these, 29, is provided with a groove, in which the lever 27 fits. During its motion downwards the releasing bar turns the lever 27 counter-clockwise about a shaft pin 28. Immediately before the loading of the spring means of the shaft 26 the lever 27 is given a clockwise motion by suitable conventional means. The releasing bar 18 is thereby pushed upwards and the shank 24 of the lever 21 leaves the locking spring, whereby the shaft 26 is locked again.

Behind the hole-finder tips with releasing lever 6 there is a locking lever 32 mounted in a pin 33 and actuated by a spring 34 for counter-clockwise motion. An ear on the locking lever 32 normally rests on a cam 35 on the releasing lever 6. When a card is introduced into the apparatus and the releasing lever is caused to rotate clockwise, the cam 35 leaves the ear of the locking lever 32, which is caused to rotate counter-clockwise. An ear 36 on the locking lever is then set in front of a locking tooth 37 on the releasing lever 13. When the releasing bar 18 is pushed upwardly after having effected punching, an ear 36 will fall into the locking tooth 37, preventing the clockwise rotation of the releasing lever 13. When the lever 27 is not actuated any longer, the releasing bar will thus remain in lifted position.

When the card is removed from the apparatus the releasing lever 6 is caused to rotate counter-clockwise, the cam 35 repulses the lever 32 and the locking tooth 37 is released. Simultaneously, the hole-finder tips 1*a* and 1*b* have rotated counter-clockwise, and therefore the shanks 3*a* and 3*b* do not actuate the locking spring 12 any longer, said spring then preventing the clockwise motion of the releasing lever 13.

When a card has no previously punched hole, it passes freely down to a movable platform 38, which is pushed downwardly until the card reaches a rigid stop 39, mounted close to the platform. The platform 38 is shaped as a lever mounted on the shaft 22 and supports a locking bar 17 on the shaftpin 40. The opposite end of the locking bar is provided with an oblong hole engaged by a rigid pin 41. The upper part of the locking bar has two unfolded ears 15 and 16 serving as stops for the locking spring 12. When the platform 38 is pushed downwardly, the locking bar 17 is driven downwardly and the ear 15 releases the locking spring 12. The releasing lever 13 is released and the punching operation starts.

When the releasing bar 18 is moved downwardly, the ear 30 on said bar presses the platform 38 downwardly and is thus unable to return to initial position before the releasing bar is restored, i. e. when the locking lever 13 and the locking spring 12 are in initial position. In this manner the locking spring will lie on the right side of the ear 15 when the locking bar is restored, even if the card should be hastily pulled up before the restoring operation is completed.

We claim:

1. A card arresting device for use in a time recording apparatus employing time cards punched with holes in row arrangement, the said device comprising card guiding means including guide tracks for slidably receiving a card and a stationary stop member forming a back stop for a card inserted in the guiding means, a pair of independently movable detecting fingers positioned side by side for detecting and entering the same punch hole in the card, a pair of locking members, each coacting with one of said fingers and movable jointly with the respective finger in the same direction, and yieldable means resiliently urging each finger and the respective locking member toward said back stop, the said fingers and locking members being disposed in a spatial relationship such that upon at least one of said fingers detecting and entering the lowest punch hole by the action of said yieldable means, the follow movement of the respective locking member presses the card against said back stop.

2. A card arresting device according to claim 1, wherein each of said fingers and the locking member associated therewith are mounted for joint rotation in the same direction in a plane transversely to the plane of said back stop, and wherein the said yieldable means comprise springs biasing said fingers and locking members for rotation toward said back stop, each of said locking members having a surface portion abutting against said back stop with a pressure engagement when the respective finger is in its a punch hole engaging position thereby arresting a card placed between the back stop and said fingers and locking members.

3. A device according to claim 2, wherein each finger and the locking member associated therewith are mounted on a common rotary shaft.

4. A device according to claim 3, wherein the said fingers and locking members are disposed in a spatial relationship relative to the back stop such that the angle defined by a perpendicular line between the back stop and the shaft axis and a line between a point of engagement of the locking member with the back stop and the shaft axis effects a pressure engagement of a locking member with the back stop when the respective finger is in its a punch hole engaging position.

References Cited in the file of this patent

UNITED STATES PATENTS

| | | |
|---|---|---|
| 321,101 | Graef | June 30, 1885 |
| 863,204 | McKee | Aug. 13, 1907 |
| 1,332,848 | Kent | Mar. 2, 1920 |
| 1,495,989 | Danly | June 3, 1924 |
| 2,078,706 | Boker | Apr. 27, 1937 |
| 2,318,567 | Duerig | May 4, 1943 |
| 2,365,521 | Brooke | Dec. 19, 1944 |
| 2,436,372 | Avery | Feb. 24, 1948 |